(12) United States Patent
Shi et al.

(10) Patent No.: US 10,986,685 B2
(45) Date of Patent: Apr. 20, 2021

(54) SYSTEM AND METHOD FOR HANDLING NETWORK FAULT IDENTIFIED ACCORDING TO AMOUNTS OF UPLINK DATA SENT AND DOWNLINK DATA RECEIVED

(71) Applicant: Huawei Technologies Co., Ltd., Shenzhen (CN)

(72) Inventors: Shuai Shi, Wuhan (CN); Qianjun Fang, Wuhan (CN); Huatao Tao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/469,322

(22) PCT Filed: Apr. 21, 2017

(86) PCT No.: PCT/CN2017/081395
§ 371 (c)(1),
(2) Date: Jun. 13, 2019

(87) PCT Pub. No.: WO2018/107635
PCT Pub. Date: Jun. 21, 2018

(65) Prior Publication Data
US 2020/0077462 A1 Mar. 5, 2020

(30) Foreign Application Priority Data
Dec. 14, 2016 (CN) .......................... 201611155224.5

(51) Int. Cl.
*H04W 76/19* (2018.01)
*H04L 12/24* (2006.01)
(Continued)

(52) U.S. Cl.
CPC ......... *H04W 76/19* (2018.02); *H04L 41/0681* (2013.01); *H04W 28/0236* (2013.01); *H04W 60/04* (2013.01)

(58) Field of Classification Search
CPC . H04W 76/19; H04W 28/0236; H04W 60/04; H04W 24/04; H04L 41/0681
See application file for complete search history.

(56) References Cited

U.S. PATENT DOCUMENTS

| 9,894,546 B2* | 2/2018 | Song ..................... H04W 16/24 |
| 10,548,000 B2* | 1/2020 | Jain ................... H04W 28/0215 |

(Continued)

FOREIGN PATENT DOCUMENTS

| CN | 101789880 A | 7/2010 |
| CN | 101998469 A | 3/2011 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 13)," 3GPP TS 36.331 V13.3.0, Jun. 2019, 627 pages.

*Primary Examiner* — Mounir Moutaouakil
(74) *Attorney, Agent, or Firm* — Slater Matsil, LLP

(57) ABSTRACT

A network fault handling method and device, the method including obtaining a first data amount of uplink data sent by a terminal device within preset duration, obtaining a second data amount of downlink packet data received by the terminal device within the preset duration, and performing, in response to determining that the first data amount is greater than a first threshold and the second data amount is equal to 0, at least one of re-establishing a radio resource control (RRC) connection or re-obtaining an Internet Protocol (IP) connection resource.

16 Claims, 5 Drawing Sheets

(51) Int. Cl.
*H04W 28/02* (2009.01)
*H04W 60/04* (2009.01)

(56) References Cited

U.S. PATENT DOCUMENTS

| | | | |
|---|---|---|---|
| 2012/0088498 A1* | 4/2012 | Xiao | H04W 24/02 |
| | | | 455/424 |
| 2012/0207040 A1* | 8/2012 | Comsa | H04W 72/1215 |
| | | | 370/252 |
| 2013/0003533 A1 | 1/2013 | Barbieri et al. | |
| 2013/0250750 A1* | 9/2013 | Nishida | H04W 76/00 |
| | | | 370/216 |
| 2014/0052874 A1 | 2/2014 | Hu | |
| 2014/0112155 A1 | 4/2014 | Lindoff et al. | |
| 2014/0317461 A1 | 10/2014 | Li et al. | |
| 2015/0249930 A1* | 9/2015 | Andrianov | H04W 24/08 |
| | | | 455/423 |
| 2017/0289040 A1* | 10/2017 | Sreeramoju | H04L 45/245 |
| 2018/0084578 A1* | 3/2018 | Kato | H04W 74/006 |

FOREIGN PATENT DOCUMENTS

| | | |
|---|---|---|
| CN | 102293029 A | 12/2011 |
| CN | 103597899 A | 2/2014 |
| CN | 103765954 A | 4/2014 |
| CN | 105557023 A | 5/2016 |
| CN | 105594141 A | 5/2016 |
| CN | 106028470 A | 10/2016 |
| EP | 2945413 A1 | 11/2015 |
| WO | 2012139798 A1 | 10/2012 |
| WO | 2013107044 A1 | 7/2013 |
| WO | 2015042779 A1 | 4/2015 |
| WO | 2015174757 A1 | 11/2015 |
| WO | 2016116155 A1 | 7/2016 |

* cited by examiner

SYSTEM AND METHOD FOR HANDLING NETWORK FAULT IDENTIFIED ACCORDING TO AMOUNTS OF UPLINK DATA SENT AND DOWNLINK DATA RECEIVED

CROSS REFERENCE TO RELATED APPLICATIONS

This application is a national stage of International Application No. PCT/CN2017/081395, filed on Apr. 21, 2017, which claims priority to Chinese Patent Application No. 201611155224.5, filed on Dec. 14, 2016. Both of the aforementioned applications are hereby incorporated by reference in their entireties.

TECHNICAL FIELD

Embodiments of the present invention relate to the field of communications technologies, and in particular, to a network fault handling method and device.

BACKGROUND

In a process in which a terminal device (for example, a mobile phone or a computer) obtains a data service from a core network, the terminal device needs to communicate with a base station, and obtains the data service from the core network by using the base station.

In an actual application process, when a downlink data link fault occurs, for example, when a downlink routing fault, a charging authentication system fault, or the like occurs in a core network, a terminal device may usually send uplink data, but the terminal device cannot receive downlink data sent by a core network side. Consequently, a user cannot obtain a normal data service by using the terminal device. In this case, based on personal experience, the user usually needs to re-switch on a data switch of the terminal device, enable and disable an airplane mode of the terminal device, or the like, so that the terminal device can normally obtain the data service.

However, in the foregoing process, the user may obviously perceive an Internet access fault, and needs to rectify a network fault by relying on the personal experience of the user, thereby resulting in poor user experience.

SUMMARY OF THE INVENTION

This application provides a network fault handling method and device, so that a downlink data link fault can be automatically detected and rectified, thereby improving user's use experience.

According to a first aspect, this application provides a network fault handling method. A network fault handling apparatus can obtain, in real time or periodically, a first data amount of uplink data sent by a terminal device within preset duration and a second data amount of downlink packet data received by the terminal device within the preset duration, analyze the first data amount and the second data amount, and may determine, when determining that the first data amount is greater than a first threshold and the second data amount is equal to 0, that a downlink of the terminal device is faulty. In this case, the network fault handling apparatus can re-establish a radio resource control (RRC) connection and/or re-obtain an Internet Protocol (IP) connection resource, to automatically rectify a downlink fault.

In the foregoing process, the network fault handling apparatus can automatically detect a downlink data link fault, and can automatically rectify the downlink data link fault when detecting the downlink data link fault, so that a user no longer perceives a network fault, and the user does not need to manually rectify the network fault, thereby improving user experience.

Optionally, a data type of the uplink data includes a Transmission Control Protocol (TCP) type, a domain name system (DNS) type, and a User Datagram Protocol (UDP) type.

In a possible implementation, before re-establishing the RRC connection and/or re-obtaining the IP connection resource, the network fault handling apparatus may further first determine that signal received quality of the terminal device is greater than a preset quality threshold.

In another possible implementation, the network fault handling apparatus may re-establish the RRC connection and/or re-obtain the IP connection resource in at least the following two feasible implementations.

One feasible implementation is re-establishing the RRC connection, and determining whether a downlink data link fault is rectified, and if it is determined that the downlink data link fault is not rectified, re-obtaining the IP connection resource.

The other feasible implementation is determining whether a quantity of data units in an uplink cache queue in a data link layer is less than a second threshold, and a quantity of data units in a downlink cache queue in the data link layer is greater than a third threshold, and if the quantity of data units in the uplink cache queue is less than the second threshold, and the quantity of data units in the downlink cache queue is greater than the third threshold, re-obtaining the IP connection resource, or if the quantity of data units in the uplink cache queue is not less than the second threshold, or the quantity of data units in the downlink cache queue is not greater than the third threshold, re-establishing the RRC connection, and determining whether a downlink data link fault is rectified, and if it is determined that the downlink data link fault is not rectified, re-obtaining the IP connection resource.

In another possible implementation, the re-establishing the RRC connection includes determining a base station to which the terminal device is currently connected, and re-establishing an RRC connection to the base station.

It may be determined, by re-establishing the RRC connection between the terminal device and the base station, that the terminal device and the base station can normally communicate with each other.

In another possible implementation, the re-obtaining the IP connection resource includes determining a first public data network (PDN) connection used to send the uplink data, determining whether a quantity of PDN connections currently existing in the terminal device is greater than 1, and if the quantity of public data network PDN connections is greater than 1, disconnecting and re-establishing the first PDN connection, or if the quantity of public data network PDN connections is not greater than 1, determining whether an operator corresponding to the terminal device supports a plurality of PDN connections, and if the operator corresponding to the terminal device supports a plurality of PDN connections, re-establishing the first PDN connection, or if the operator corresponding to the terminal device does not support a plurality of PDN connections, triggering a tracking area update (TAU) procedure.

The first PDN connection is reconnected or the TAU procedure is triggered, so that the terminal device can re-obtain the IP connection resource, and therefore it may be determined that the terminal device and a core network can normally communicate with each other.

In another possible implementation, the re-establishing the first PDN connection includes determining a core network corresponding to the uplink data, and establishing a standby PDN connection to the core network, disconnecting and re-establishing the first PDN connection, and disconnecting the standby PDN connection.

According to a second aspect, this application provides a network fault handling device, including a processor, a memory, and a communications bus. The memory is configured to store a program instruction, the communications bus is configured to implement a connection between components, and the processor is configured to read the program instruction from the memory to perform the following operations, including obtaining a first data amount of uplink data sent by a terminal device within preset duration, obtaining a second data amount of downlink packet data received by the terminal device within the preset duration, and when determining that the first data amount is greater than a first threshold and the second data amount is equal to 0, re-establishing a radio resource control RRC connection and/or re-obtaining an Internet Protocol IP connection resource.

In a possible implementation, a data type of the uplink data includes a Transmission Control Protocol (TCP) type, a domain name system (DNS) type, and a User Datagram Protocol (UDP) type.

In another possible implementation, before the processor re-establishes the RRC connection and/or re-obtains the IP connection resource, the processor is further configured to determine that signal received quality of the terminal device is greater than a preset quality threshold.

In another possible implementation, the processor is specifically configured to re-establish the RRC connection, and determine whether a downlink data link fault is rectified, and if it is determined that the downlink data link fault is not rectified, re-obtain the IP connection resource.

In another possible implementation, the processor is specifically configured to determine whether a quantity of data units in an uplink cache queue in a data link layer is less than a second threshold, and a quantity of data units in a downlink cache queue in the data link layer is greater than a third threshold, and if the quantity of data units in the uplink cache queue is less than the second threshold, and the quantity of data units in the downlink cache queue is greater than the third threshold, re-obtain the IP connection resource, or if the quantity of data units in the uplink cache queue is not less than the second threshold, or the quantity of data units in the downlink cache queue is not greater than the third threshold, re-establish the RRC connection, and determine whether a downlink data link fault is rectified, and if it is determined that the downlink data link fault is not rectified, re-obtain the IP connection resource.

In another possible implementation, the processor is specifically configured to determine a base station to which the terminal device is currently connected, and re-establish an RRC connection to the base station.

In another possible implementation, the processor is specifically configured to determine a first PDN connection used to send the uplink data, determine whether a quantity of PDN connections currently existing in the terminal device is greater than 1, and if the quantity of public data network PDN connections is greater than 1, disconnect and re-establish the first PDN connection, or if the quantity of public data network PDN connections is not greater than 1, determine whether an operator corresponding to the terminal device supports a plurality of PDN connections, and if the operator corresponding to the terminal device supports a plurality of PDN connections, re-establish the first PDN connection, or if the operator corresponding to the terminal device does not support a plurality of PDN connections, trigger a tracking area update TAU procedure.

In another possible implementation, the processor is specifically configured to determine a core network corresponding to the uplink data, and establish a standby PDN connection to the core network, disconnect and re-establish the first PDN connection, and disconnect the standby PDN connection.

According to a third aspect, this application provides a network fault handling apparatus, including an obtaining module and a fault handling module, where the obtaining module is configured to obtain a first data amount of uplink data sent by a terminal device within preset duration, the obtaining module is further configured to obtain a second data amount of downlink packet data received by the terminal device within the preset duration, and the fault handling module is configured to when determining that the first data amount is greater than a first threshold and the second data amount is equal to 0, re-establish a radio resource control (RRC) connection and/or re-obtain an Internet Protocol (IP) connection resource.

In a possible implementation, a data type of the uplink data includes a Transmission Control Protocol (TCP) type, a domain name system (DNS) type, and a User Datagram Protocol (UDP) type.

In another possible implementation, the apparatus further includes a determining module, where the determining module is configured to before the fault handling module re-establishes the RRC connection and/or re-obtains the IP connection resource, determine that signal received quality of the terminal device is greater than a preset quality threshold.

In another possible implementation, the fault handling module is specifically configured to re-establish the RRC connection, and determine whether a downlink data link fault is rectified, and if it is determined that the downlink data link fault is not rectified, re-obtain the IP connection resource.

In another possible implementation, the fault handling module is specifically configured to determine whether a quantity of data units in an uplink cache queue in a data link layer is less than a second threshold, and a quantity of data units in a downlink cache queue in the data link layer is greater than a third threshold, and if the quantity of data units in the uplink cache queue is less than the second threshold, and the quantity of data units in the downlink cache queue is greater than the third threshold, re-obtain the IP connection resource, or if the quantity of data units in the uplink cache queue is not less than the second threshold, or the quantity of data units in the downlink cache queue is not greater than the third threshold, re-establish the RRC connection, and determine whether a downlink data link fault is rectified, and if it is determined that the downlink data link fault is not rectified, re-obtain the IP connection resource.

In another possible implementation, the fault handling module is specifically configured to determine a base station to which the terminal device is currently connected, and re-establish an RRC connection to the base station.

In another possible implementation, the fault handling module is specifically configured to determine a first PDN connection used to send the uplink data, determine whether a quantity of PDN connections currently existing in the terminal device is greater than 1, and if the quantity of PDN connections is greater than 1, disconnect and re-establish the first PDN connection, or if the quantity of PDN connections is not greater than 1, determine whether an operator corresponding to the terminal device supports a plurality of PDN connections, and if the operator corresponding to the terminal device supports a plurality of PDN connections, re-establish the first PDN connection, or if the operator corresponding to the terminal device does not support a plurality of PDN connections, trigger a tracking area update TAU procedure.

In another possible implementation, the fault handling module is specifically configured to determine a core network corresponding to the uplink data, and establish a standby PDN connection to the core network, disconnect and re-establish the first PDN connection, and disconnect the standby PDN connection.

According to the network fault handling method and device provided in this application, the network fault handling apparatus obtains the first data amount of the uplink data sent by the terminal device within the preset duration, obtains the second data amount of the downlink packet data received by the terminal device within the preset duration, and may determine, when determining that the first data amount is greater than the first threshold and the second data amount is equal to 0, that the downlink data link fault occurs. In this case, the network fault handling apparatus rectifies the downlink data link fault by re-establishing the RRC connection and/or re-obtaining the IP connection resource. It can be ensured, by re-establishing the RRC connection, that a link between the terminal device and the base station is normal, and it can be ensured, by re-obtaining the IP connection resource, that a link between the terminal device and the core network is normal. Therefore, the network fault handling apparatus can effectively rectify the downlink data link fault in the foregoing manner. In the foregoing process, the network fault handling apparatus can automatically detect the downlink data link fault, and can automatically rectify the downlink data link fault when detecting the downlink data link fault, so that a user no longer perceives a network fault, and the user does not need to manually rectify the network fault, thereby improving user experience.

DETAILED DESCRIPTION OF ILLUSTRATIVE EMBODIMENTS

Figure 1:
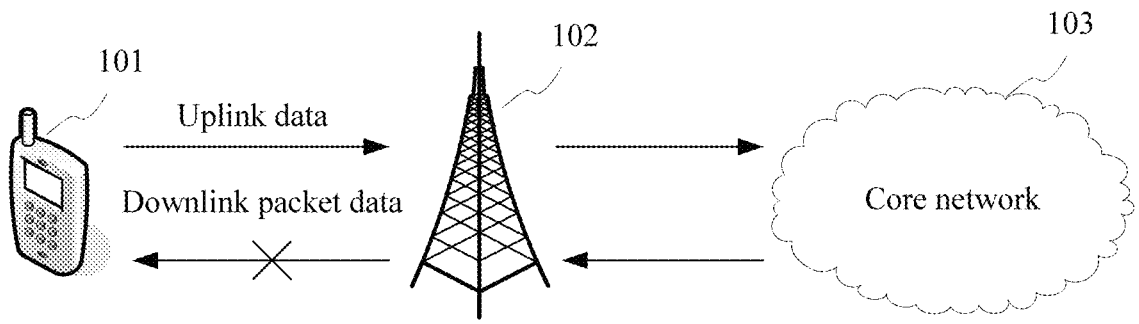
FIG. 1 is a schematic diagram of an application scenario of a network fault handling method according to this application.

FIG. 1 is a schematic diagram of an application scenario of a network fault handling method according to this application. Referring to FIG. 1, the application scenario includes a terminal device 101, a base station 102, and a core network 103. The terminal device 101 can normally send uplink data to the base station 102, but the terminal device 101 cannot receive downlink packet data sent by the core network 103.

The terminal device may be a wireless terminal or a wired terminal. The wireless terminal may refer to a device that provides a user with voice and/or other service data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, a remote terminal, an access terminal, a user terminal, a user agent, or user equipment (User Device or UE), which is not limited herein.

The base station may be a base transceiver station (BTS) in Global System for Mobile communications (GSM) or Code Division Multiple Access (CDMA), or may be a NodeB (NB) in Wideband Code Division Multiple Access (WCDMA), or may be an evolved NodeB (Evolutional NodeB, eNB or eNodeB) in Long Term Evolution (LTE), which is not limited herein.

The following describes technical solutions of this application in detail with reference to specific embodiments. It should be noted that the following specific embodiments may be combined with each other, and same or similar content is not repeatedly described in different embodiments.

Figure 2:
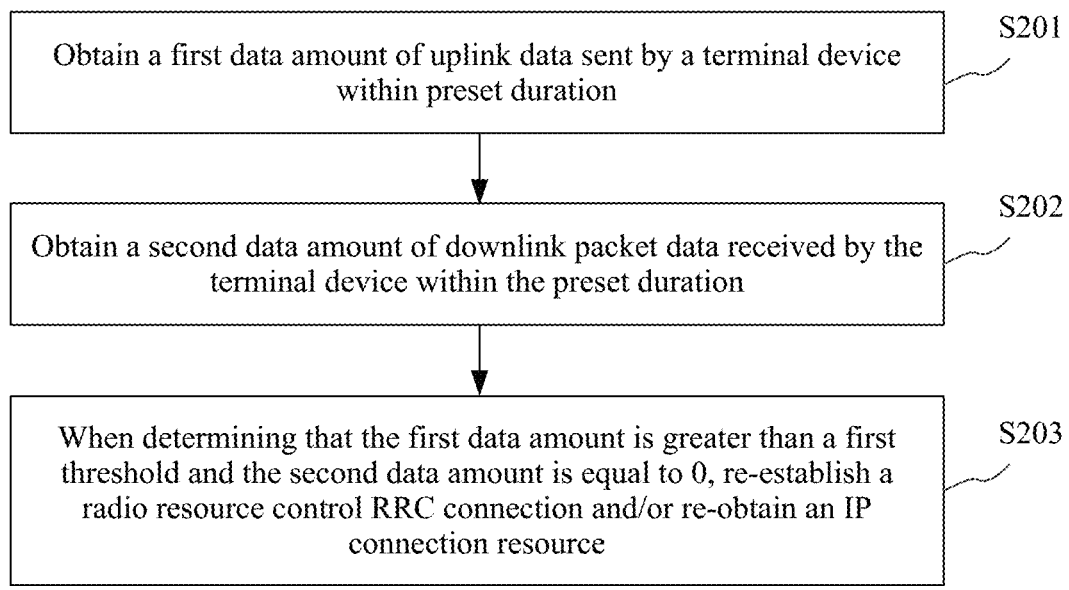
FIG. 2 is a first schematic flowchart of a network fault handling method according to this application.

FIG. 2 is a first schematic flowchart of a network fault handling method according to this application. Referring to FIG. 2, the method may include the following steps.

S201. Obtain a first data amount of uplink data sent by a terminal device within preset duration.

A technical solution provided in this application may be executed by a network fault handling apparatus. The network fault handling apparatus is disposed in a terminal. Optionally, the network fault handling apparatus may be implemented by using software and/or hardware.

Optionally, the preset duration may be a plurality of consecutive sampling periods. For example, duration of one sampling period may be 4 seconds, and the preset duration may be four consecutive sampling periods, to be specific, the preset duration may be 16 seconds. Certainly, in an actual application process, the preset duration may be set based on an actual requirement. This is not specifically limited in this application.

In this application, the uplink data is usually data related to a data service of a user, and the uplink data is usually used to instruct a core network to feed back a response message. Optionally, a type of the uplink data may include a Transmission Control Protocol (TCP) type, a domain name system (DNS) type, and a User Datagram Protocol (UDP) type. Optionally, the uplink data may be IPv4 data, or may be IPv6 data.

Optionally, the first data amount may be a quantity of packets of the uplink data sent by the terminal device within the preset duration.

Optionally, a baseband processor modem of the terminal device may monitor and collect statistics about the uplink data of the terminal device.

S202. Obtain a second data amount of downlink packet data received by the terminal device within the preset duration.

In this application, the downlink packet data is downlink data sent by the core network to the terminal device.

Optionally, the second data amount may be a quantity of packets of the downlink data received by the terminal device within the preset duration.

S203. When determining that the first data amount is greater than a first threshold and the second data amount is equal to 0, re-establish a radio resource control RRC connection and/or re-obtain an IP connection resource.

After determining that the first data amount and the second data amount are obtained, the network fault handling apparatus determines whether the first data amount is greater than the first threshold and the second data amount is 0, and if the first data amount is greater than the first threshold and the second data amount is 0, the network fault handling apparatus may determine that a downlink data link is faulty. It should be noted that when determining that the first data amount is greater than the first threshold and the second data amount is less than a preset threshold, the network fault handling apparatus may determine that a downlink data link is faulty. In an actual application process, a value of the preset threshold is usually relatively small, and the first threshold and the preset threshold may be set based on an actual requirement. This is not specifically limited in this application.

Optionally, after determining that the first data amount is greater than the first threshold and the second data amount is equal to 0, the network fault handling apparatus may further obtain signal received quality of the terminal device, and determine whether the signal received quality is greater than a preset quality threshold, and if the signal received quality is not greater than the preset quality threshold, it may indicate that the terminal device cannot receive the downlink packet data because the signal received quality of the terminal device is extremely poor. In this case, the network fault handling apparatus cannot determine whether a downlink data link is faulty.

After the downlink data link is determined to be faulty, optionally, the terminal device may send a connection re-establishment request (CRC) message to a base station, to request to re-establish an RRC connection to the base station. After the RRC connection between the terminal device and the base station is re-established, the terminal device may determine whether a downlink data link fault is rectified, and if the downlink data link fault is rectified, a procedure ends, or if the downlink data link fault is not rectified, the IP connection resource is re-obtained. Optionally, the terminal device may determine whether the downlink packet data can be received, and if the downlink packet data can be received, it indicates that the downlink data link is repaired, or if the downlink packet data cannot be received, it indicates that the downlink data link is not repaired. Optionally, the IP connection resource may be re-obtained by re-establishing a PDN connection between the terminal device and the core network or triggering a tracking area update (TAU) TAU procedure. Specifically, a method for re-obtaining the IP connection resource is described in detail in the embodiment shown in FIG. 3, and is not described herein.

Optionally, for a process of re-obtaining the IP connection resource, refer to Section 6.1.1 "the request for resources (IP connectivity to a PDN or dedicated bearer resources) by the UE" in the 3GPP TS 24.301 V14.3.0 (2017-03). Optionally, the process of re-obtaining the IP connection resource may be implemented in one or more of manners such as establishing a PDN connection, disconnecting a PDN connection, allocating a bearer resource, and modifying a bearer resource. For implementation processes of establishing the PDN connection, disconnecting the PDN connection, allocating the bearer resource, and modifying the bearer resource, refer to the 3GPP TS 24.301 V14.3.0 (2017-03). In this application, details are not described herein.

For a process of re-establishing the RRC connection, refer to Section 5.3.7 RRC connection re-establishment in the 3GPP TS 36.331 version 9.2.0 Release 9, and details are not described herein.

The RRC connection between the terminal device and the base station is re-established, so that the base station can re-allocate a resource to the terminal device, so as to resolve a problem that because the resource allocated by the base station to the terminal device is abnormal (for example, insufficient), the base station cannot send, to the terminal device, data delivered by the core network. The IP connection resource is re-obtained, so that the core network can re-allocate a resource to the terminal device, so as to resolve a problem that because the resource allocated by the core network to the terminal device is abnormal, the core network cannot send data to the terminal device by using the base station.

It should be noted that, in an actual application process, the technical solution shown in this application may be further executed in a process in which a user is using the terminal device (for example, a mobile phone is in a screen-on state).

According to the network fault handling method provided in this application, the network fault handling apparatus obtains the first data amount of the uplink data sent by the terminal device within the preset duration, obtains the second data amount of the downlink packet data received by the terminal device within the preset duration, and may determine, when determining that the first data amount is greater than the first threshold and the second data amount is equal to 0, that the downlink data link fault occurs. In this case, the network fault handling apparatus rectifies the downlink data link fault by re-establishing the RRC connection and/or re-obtaining the IP connection resource. It can be ensured, by re-establishing the RRC connection, that a link between the terminal device and the base station is normal, and it can be ensured, by re-obtaining the IP connection resource, that a link between the terminal device and the core network is normal. Therefore, the network fault handling apparatus can effectively rectify the downlink data link fault in the foregoing manner. In the foregoing process, the network fault handling apparatus can automatically detect the downlink data link fault, and can automatically rectify the downlink data link fault when detecting the downlink data link fault, so that a user no longer perceives a network fault, and the user does not need to manually rectify the network fault, thereby improving user experience.

Based on the embodiment shown in FIG. 2, optionally, the IP connection resource may be re-obtained in the following feasible implementation. For details, refer to the embodiment shown in FIG. 3.

Figure 3:
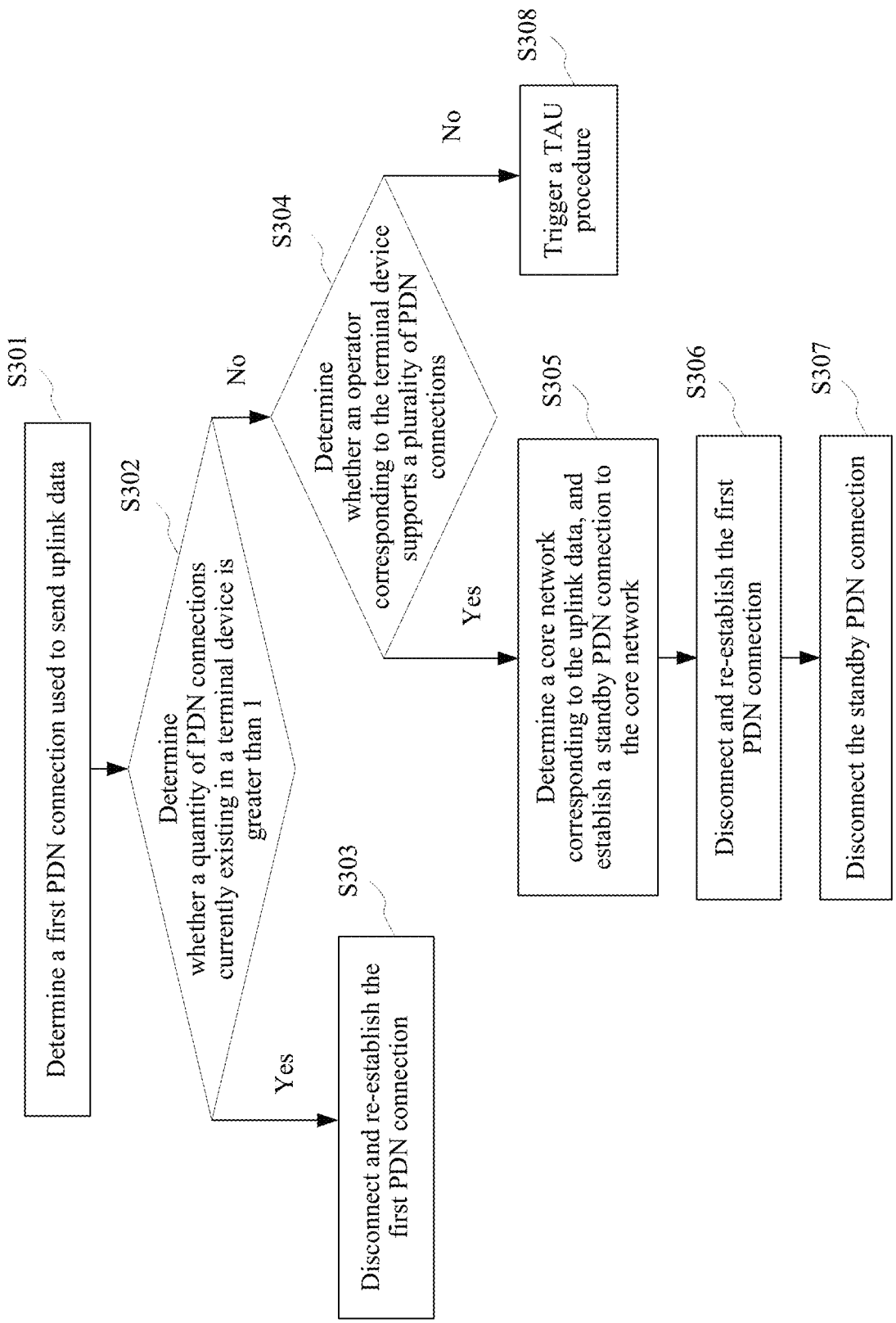
FIG. 3 is a schematic flowchart of a method for re-obtaining an IP connection resource according to this application.

FIG. 3 is a schematic flowchart of a method for re-obtaining an IP connection resource according to this application. Referring to FIG. 3, the method may include the following steps.

S301. Determine a first PDN connection used to send uplink data.

In an actual application process, a PDN connection used by a core network to send downlink data is the same as a PDN connection used for uplink data corresponding to the downlink data. For example, if the core network receives, by using a PDN 1, uplink data sent by a terminal device, when the core network needs to send downlink data corresponding to the uplink data to the terminal device, the core network sends the downlink data to the terminal device by using the PDN 1.

S302. Determine whether a quantity of PDN connections currently existing in a terminal device is greater than 1.

S303 is performed if the quantity of PDN connections is greater than 1.

S304 to S306 are performed if the quantity of PDN connections is not greater than 1.

In an actual application process, the PDN connection currently existing in the terminal device is configured in the terminal device, and there may be one or more PDN connections currently existing in the terminal device.

S303. Disconnect and re-establish the first PDN connection.

If the quantity of PDN connections currently existing in the terminal device is greater than 1, a first PDN connection may be directly reconnected. Optionally, the first PDN connection may be directly disconnected and re-established.

Optionally, for a process of establishing the PDN connection, refer to Section 6.5.1 in the 3GPP 24.301. For a process of disconnecting the PDN connection, refer to Section 6.5.2 in the 3GPP 24.301, and details are not described herein.

S304. Determine whether an operator corresponding to the terminal device supports a plurality of PDN connections.

S305 to S307 are performed if the operator corresponding to the terminal device supports a plurality of PDN connections.

S308 is performed if the operator corresponding to the terminal device does not support a plurality of PDN connections.

Optionally, the operator corresponding to the terminal device is an operator that currently provides a network server for the terminal device.

S305. Determine a core network corresponding to the uplink data, and establish a standby PDN connection to the core network.

Optionally, the terminal device may obtain, from the operator, a parameter (for example, an access point (Access Point Name, APN) parameter) corresponding to the standby PDN connection, and establish the standby PDN connection to the core network based on the parameter corresponding to the standby PDN connection.

S306. Disconnect and re-establish the first PDN connection.

S307. Disconnect the standby PDN connection.

S308. Trigger a TAU procedure.

Optionally, the terminal device may send a TAU request message to the core network, so that the core network updates a tracking area (Tracking Area, TA) parameter of the terminal device.

In the foregoing process, based on a PDN connection status of the terminal device, a PDN between the terminal device and the core network is reconnected or the TAU procedure is triggered, to re-obtain an IP connection resource.

Figure 4A:
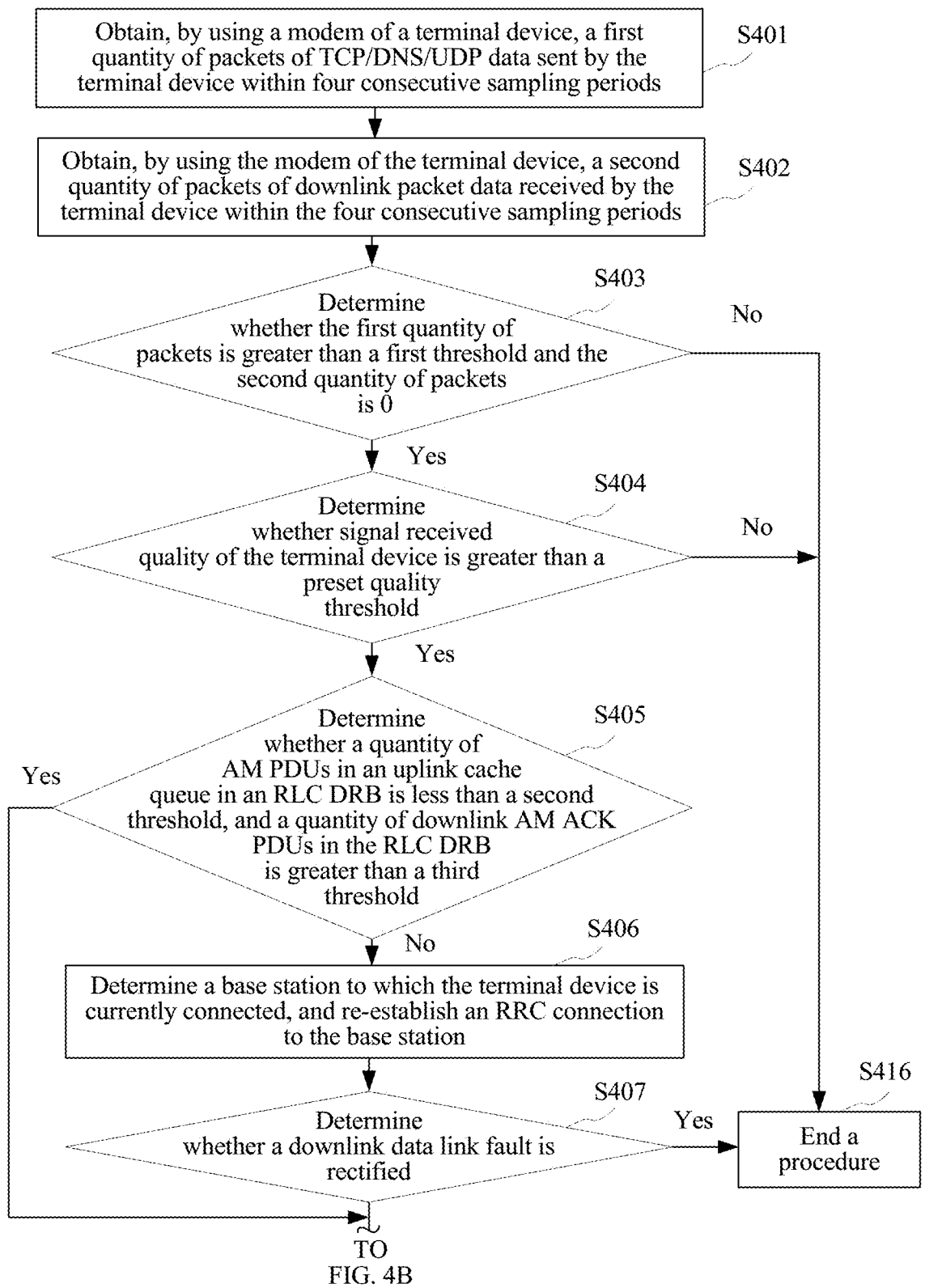
FIG. 4A and FIG. 4B are a second schematic flowchart of a network fault handling method according to this application.
Figure 4B:
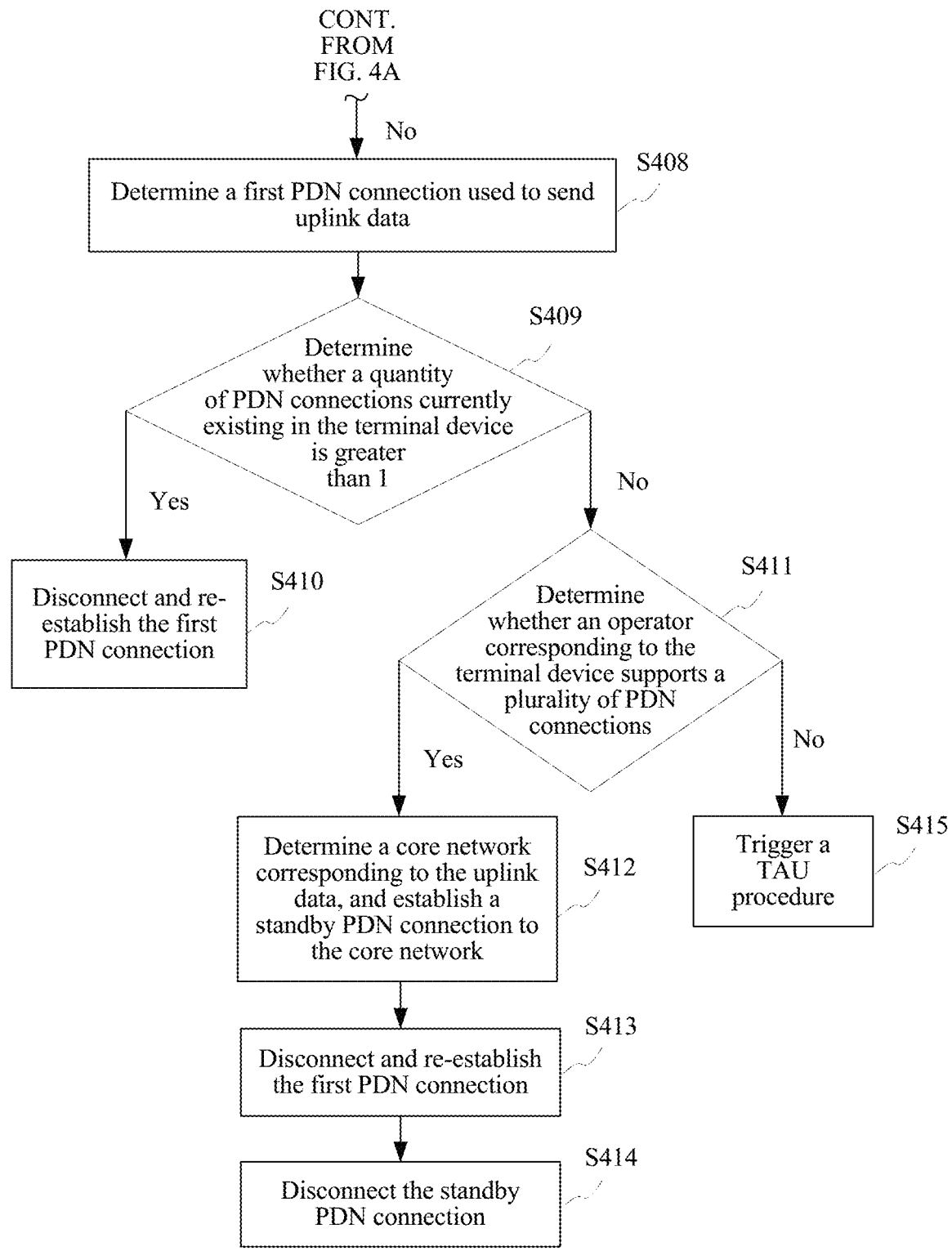

Based on any one of the foregoing embodiments, the following describes in detail, with reference to FIG. 4A and FIG. 4B by using a specific example, the technical solution shown in the foregoing method embodiment.

FIG. 4A and FIG. 4B are a second schematic flowchart of a network fault handling method according to this application. Referring to FIG. 4A and FIG. 4B, the method may include the following steps.

S401. Obtain, by using a modem of a terminal device, a first quantity of packets of TCP/DNS/UDP data sent by the terminal device within four consecutive sampling periods.

For example, the sampling period may be 4 seconds. Certainly, the sampling period may be set based on an actual requirement.

S402. Obtain, by using the modem of the terminal device, a second quantity of packets of downlink packet data received by the terminal device within the four consecutive sampling periods.

S403. Determine whether the first quantity of packets is greater than a first threshold and whether the second quantity of packets is 0.

S404 is performed if the first quantity of packets is greater than the first threshold and the second quantity of packets is 0.

S416 is performed if the first quantity of packets is not greater than the first threshold or the second quantity of packets is not 0.

When it is determined that the first quantity of packets is less than the first threshold or the second quantity of packets is greater than 0, it cannot be determined whether a downlink data link is faulty, and a procedure ends.

S404. Determine whether signal received quality of the terminal device is greater than a preset quality threshold.

S405 is performed if the signal received quality of the terminal device is greater than the preset quality threshold.

S416 is performed if the signal received quality of the terminal device is not greater than the preset quality threshold.

When it is determined that the signal received quality of the terminal device is less than or equal to the preset quality threshold, it may indicate that the terminal device cannot receive the downlink packet data because the signal received quality of the terminal device is extremely poor. Therefore, it cannot be determined whether a downlink data link is faulty, and a procedure ends.

S405. Determine whether a quantity of acknowledgement mode protocol data units (AM PDU) in an uplink cache queue in a radio link control (RLC) data radio bearer (DRB) is less than a second threshold, and a quantity of downlink acknowledgement mode acknowledgement protocol data units (AM ACK PDU) in the RLC DRB is greater than a third threshold.

S408 is performed if the quantity of acknowledgement mode protocol data units in the uplink cache queue is less than the second threshold, and the quantity of downlink acknowledgement mode acknowledgement protocol data units is greater than the third threshold.

S406 is performed if the quantity of acknowledgement mode protocol data units in the uplink cache queue is not less than the second threshold, or the quantity of downlink acknowledgement mode acknowledgement protocol data units is not greater than the third threshold.

When it is determined that the quantity of downlink AM ACK PDUs in the RLC DRB is greater than the third threshold, it indicates that a base station can normally send feedback information to the terminal device. When it is determined that the quantity of AM PDUs in the uplink cache queue in the RLC DRB is less than the second threshold, it indicates that the terminal device can send to-be-sent uplink data to the base station in time by using a data link layer. Therefore, when it is determined that the quantity of AM PDUs in the uplink cache queue in the RLC DRB is less than the second threshold, and the quantity of downlink AM ACK PDUs in the RLC DRB is greater than the third threshold, it may be determined that an RRC link between the terminal device and the base station is normal. Otherwise, it indicates that an RRC link between the terminal device and the base station is faulty.

S406. Determine a base station to which the terminal device is currently connected, and re-establish an RRC connection to the base station.

S407. Determine whether a downlink data link fault is rectified.

S416 is performed if the downlink data link fault is rectified.

S408 is performed if the downlink data link fault is not rectified.

S408. Determine a first PDN connection used to send uplink data.

It should be noted that for a process of performing S408, refer to S302, and details are not described herein again.

S409. Determine whether a quantity of PDN connections currently existing in the terminal device is greater than 1.

S410 is performed if the quantity of PDN connections is greater than 1.

S411 is performed if the quantity of PDN connections is not greater than 1.

S410. Disconnect and re-establish the first PDN connection.

It should be noted that for a process of performing S410, refer to S303, and details are not described herein again.

S411. Determine whether an operator corresponding to the terminal device supports a plurality of PDN connections.

S412 to S414 are performed if the operator corresponding to the terminal device supports a plurality of PDN connections.

S415 is performed if the operator corresponding to the terminal device does not support a plurality of PDN connections.

S412. Determine a core network corresponding to the uplink data, and establish a standby PDN connection to the core network.

S413. Disconnect and re-establish the first PDN connection.

S414. Disconnect the standby PDN connection.

It should be noted that for processes of performing S412 to S414, refer to S305 to S307, and details are not described herein again.

S415. Trigger a TAU procedure.

It should be noted that for a process of performing S415, refer to S308, and details are not described herein again.

S416. End a procedure.

In the embodiment shown in FIG. 4A and FIG. 4B, a network fault handling apparatus can automatically detect the downlink data link fault, and can automatically rectify the downlink data link fault when detecting the downlink data link fault, so that a user no longer perceives a network fault, and the user does not need to manually rectify the network fault, thereby improving user experience.

Figure 5:
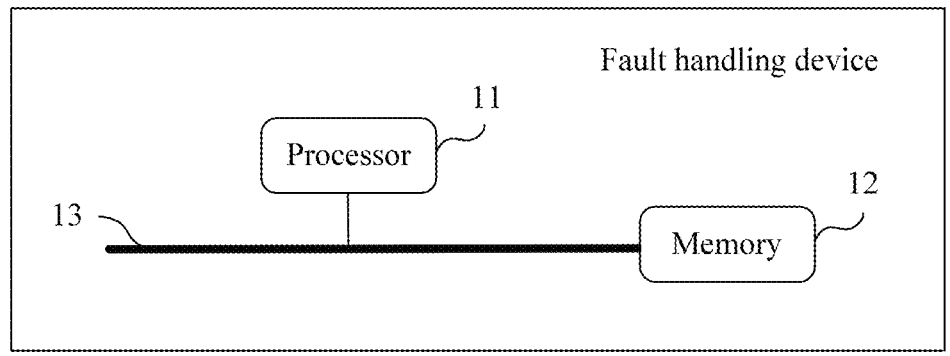
FIG. 5 is a schematic structural diagram of a network fault handling device according to this application.

FIG. 5 is a schematic structural diagram of a network fault handling device according to this application. Optionally, the network fault handling device may be disposed in a terminal device. Referring to FIG. 5, the device may include a processor 11, a memory 12, and a communications bus 13. The memory 12 is configured to store a program instruction, the communications bus 13 is configured to implement a connection between components, and the processor 11 is configured to read the program instruction from the memory to perform the following operations, including obtaining a first data amount of uplink data sent by a terminal device within preset duration, obtaining a second data amount of downlink packet data received by the terminal device within the preset duration, and when determining that the first data amount is greater than a first threshold and the second data amount is equal to 0, re-establishing an RRC connection and/or re-obtaining an IP connection resource.

The network fault handling device provided in this application may execute the technical solution shown in the foregoing method embodiment. An implementation principle and a beneficial effect of the network fault handling device are similar to those of the foregoing method embodiment, and details are not described herein.

In a possible implementation, a data type of the uplink data includes a TCP type, a DNS type, and a UDP type.

In another possible implementation, before the processor 11 re-establishes the RRC connection and/or re-obtains the IP connection resource, the processor 11 is further configured to determine that signal received quality of the terminal device is greater than a preset quality threshold.

In another possible implementation, the processor 11 is specifically configured to re-establish the RRC connection, and determine whether a downlink data link fault is rectified, and if it is determined that the downlink data link fault is not rectified, re-obtain the IP connection resource.

In another possible implementation, the processor 11 is specifically configured to determine whether a quantity of data units in an uplink cache queue in a data link layer is less than a second threshold, and a quantity of data units in a downlink cache queue in the data link layer is greater than a third threshold, and if the quantity of data units in the uplink cache queue is less than the second threshold, and the quantity of data units in the downlink cache queue is greater than the third threshold, re-obtain the IP connection resource, or if the quantity of data units in the uplink cache queue is not less than the second threshold, or the quantity of data units in the downlink cache queue is not greater than the third threshold, re-establish the RRC connection, and determine whether a downlink data link fault is rectified, and if it is determined that the downlink data link fault is not rectified, re-obtain the IP connection resource.

In another possible implementation, the processor 11 is specifically configured to determine a base station to which the terminal device is currently connected, and re-establish an RRC connection to the base station.

In another possible implementation, the processor 11 is specifically configured to determine a first PDN connection used to send the uplink data, determine whether a quantity of PDN connections currently existing in the terminal device is greater than 1, and if the quantity of PDN connections is greater than 1, disconnect and re-establish the first PDN connection, or if the quantity of public data network PDN connections is not greater than 1, determine whether an operator corresponding to the terminal device supports a plurality of PDN connections, and if the operator corresponding to the terminal device supports a plurality of PDN connections, re-establish the first PDN connection, or if the operator corresponding to the terminal device does not support a plurality of PDN connections, trigger a tracking area update TAU procedure.

In another possible implementation, the processor 11 is specifically configured to determine a core network corresponding to the uplink data, and establish a standby PDN connection to the core network, disconnect and re-establish the first PDN connection, and disconnect the standby PDN connection.

The network fault handling device provided in this application may execute the technical solution shown in the foregoing method embodiment. An implementation principle and a beneficial effect of the network fault handling device are similar to those of the foregoing method embodiment, and details are not described herein.

Figure 6:
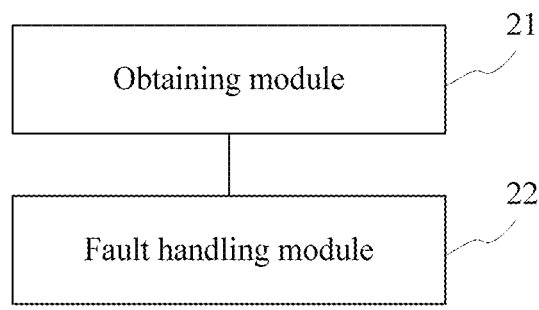
FIG. 6 is a first schematic structural diagram of a network fault handling apparatus according to this application.

FIG. 6 is a first schematic structural diagram of a network fault handling apparatus according to this application. Optionally, the network fault handling apparatus may be disposed in a terminal device. Referring to FIG. 6, the apparatus may include an obtaining module 21 and a fault handling module 22.

The obtaining module 21 is configured to obtain a first data amount of uplink data sent by a terminal device within preset duration.

The obtaining module 21 is further configured to obtain a second data amount of downlink packet data received by the terminal device within the preset duration.

The fault handling module 22 is configured to when determining that the first data amount is greater than a first threshold and the second data amount is equal to 0, re-establish a radio resource control RRC connection and/or re-obtain an Internet Protocol IP connection resource.

The network fault handling apparatus provided in this application may execute the technical solution shown in the foregoing method embodiment. An implementation principle and a beneficial effect of the network fault handling apparatus are similar to those of the foregoing method embodiment, and details are not described herein.

In another possible implementation, a data type of the uplink data includes a TCP type, a DNS type, and a UDP type.

Figure 7:
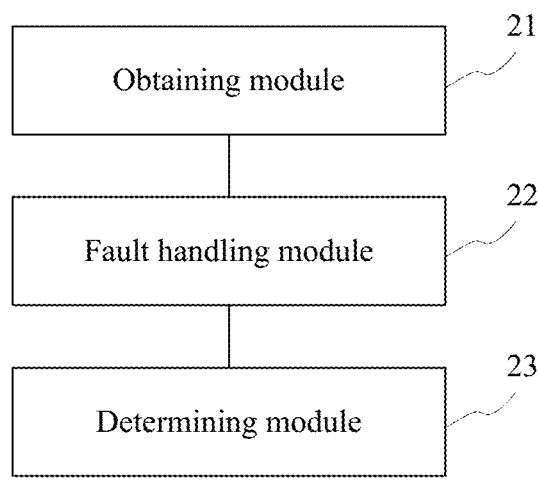
FIG. 7 is a second schematic structural diagram of a network fault handling apparatus according to this application.

FIG. 7 is a second schematic structural diagram of a network fault handling apparatus according to this application. Based on the embodiment shown in FIG. 6, referring to FIG. 7, the apparatus further includes a determining module 23.

The determining module 23 is configured to before the fault handling module 22 re-establishes the RRC connection and/or re-obtains the IP connection resource, determine that signal received quality of the terminal device is greater than a preset quality threshold.

In another possible implementation, the fault handling module 22 is specifically configured to re-establish the RRC connection, and determine whether a downlink data link fault is rectified, and if it is determined that the downlink data link fault is not rectified, re-obtain the IP connection resource.

In another possible implementation, the fault handling module 22 is specifically configured to determine whether a quantity of data units in an uplink cache queue in a data link layer is less than a second threshold, and a quantity of data units in a downlink cache queue in the data link layer is greater than a third threshold, and if the quantity of data units in the uplink cache queue is less than the second threshold, and the quantity of data units in the downlink cache queue is greater than the third threshold, re-obtain the IP connection resource, or if the quantity of data units in the uplink cache queue is not less than the second threshold, or the quantity of data units in the downlink cache queue is not greater than the third threshold, re-establish the RRC connection, and determine whether a downlink data link fault is rectified, and if it is determined that the downlink data link fault is not rectified, re-obtain the IP connection resource.

In another possible implementation, the fault handling module 22 is specifically configured to determine a base station to which the terminal device is currently connected, and re-establish an RRC connection to the base station.

In another possible implementation, the fault handling module 22 is specifically configured to determine a first PDN connection used to send the uplink data, determine whether a quantity of PDN connections currently existing in the terminal device is greater than 1, and if the quantity of PDN connections is greater than 1, disconnect and re-establish the first PDN connection, or if the quantity of PDN connections is not greater than 1, determine whether an operator corresponding to the terminal device supports a plurality of PDN connections, and if the operator corresponding to the terminal device supports a plurality of PDN connections, re-establish the first PDN connection, or if the operator corresponding to the terminal device does not support a plurality of PDN connections, trigger a tracking area update TAU procedure.

In another possible implementation, the fault handling module 22 is specifically configured to determine a core network corresponding to the uplink data, and establish a standby PDN connection to the core network, disconnect and re-establish the first PDN connection, and disconnect the standby PDN connection.

The network fault handling apparatus provided in this application may execute the technical solution shown in the foregoing method embodiment. An implementation principle and a beneficial effect of the network fault handling apparatus are similar to those of the foregoing method embodiment, and details are not described herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read only memory (ROM), a random access memory (RAM), a magnetic disk, or an optical disc.

What is claimed is:
1. A network fault handling method, comprising:
  obtaining, by a terminal device, a first data amount of uplink data sent by the terminal device within a preset duration;
  obtaining, by the terminal device, a second data amount of downlink packet data received by the terminal device within the preset duration, wherein the downlink packet data is downlink data sent to the terminal device by a core network; and
  performing, by the terminal device, in response to determining that the first data amount is greater than a first threshold and the second data amount is equal to 0, at least one of re-establishing a radio resource control (RRC) connection or re-obtaining an Internet Protocol (IP) connection resource;
  wherein the re-obtaining the IP connection resource comprises:
    determining a first public data network (PDN) connection used to send the uplink data;

determining whether a quantity of public data network PDN connections currently existing in the terminal device is greater than 1; and performing at least one of:
- disconnecting and re-establishing the first PDN connection if the quantity of PDN connections is greater than 1; or
- determining whether an operator corresponding to the terminal device supports a plurality of PDN connections if the quantity of public data network PDN connections is not greater than 1, and performing at least one of:
  - re-establishing the first PDN connection if the operator corresponding to the terminal device supports a plurality of PDN connections; or
  - triggering a tracking area update TAU procedure if the operator corresponding to the terminal device does not support a plurality of PDN connections.

2. The method according to claim 1, wherein a data type of the uplink data is at least one of a Transmission Control Protocol (TCP) type, a domain name system (DNS) type, and a User Datagram Protocol (UDP) type.

3. The method according to claim 1, further comprising: determining that signal received quality of the terminal device is greater than a preset quality threshold before the at least one of the re-establishing the RRC connection or re-obtaining the IP connection resource.

4. The method according to claim 1, wherein the re-establishing the RRC connection or re-obtaining the IP connection resource comprises:
re-establishing the RRC connection, and determining whether a downlink data link fault is rectified; and
if it is determined that the downlink data link fault is not rectified, re-obtaining the IP connection resource.

5. The method according to claim 1, wherein the re-establishing the RRC connection or re-obtaining the IP connection resource comprises:
determining whether a quantity of data units in an uplink cache queue in a data link layer is less than a second threshold, and a quantity of data units in a downlink cache queue in the data link layer is greater than a third threshold; and
performing at least one of
re-obtaining the IP connection resource if the quantity of data units in the uplink cache queue is less than the second threshold, and the quantity of data units in the downlink cache queue is greater than the third threshold; or
performing, if the quantity of data units in the uplink cache queue is not less than the second threshold, or the quantity of data units in the downlink cache queue is not greater than the third threshold:
re-establishing the RRC connection; and
determining whether a downlink data link fault is rectified, and if it is determined that the downlink data link fault is not rectified, re-obtaining the IP connection resource.

6. The method according to claim 1, wherein the re-establishing the RRC connection comprises:
determining a base station to which the terminal device is currently connected; and
re-establishing an RRC connection to the base station.

7. The method according to claim 1, wherein the re-establishing the first PDN connection comprises:
determining a core network corresponding to the uplink data, and establishing a standby PDN connection to the core network;
disconnecting and re-establishing the first PDN connection; and
disconnecting the standby PDN connection.

8. A network fault handling device, comprising:
a processor;
a communications bus; and
a non-transitory computer-readable storage medium storing a program to be executed by the processor;
wherein the communications bus is configured to implement a connection between components, and wherein the program includes instructions for:
obtaining a first data amount of uplink data sent by a terminal device within preset duration;
obtaining a second data amount of downlink packet data received by the terminal device within the preset duration, wherein the downlink packet data is downlink data sent to the terminal device by a core network; and
performing, in response to determining that the first data amount is greater than a first threshold and the second data amount is equal to 0, at least one of re-establishing a radio resource control (RRC) connection or re-obtaining an Internet Protocol (IP) connection resource;
wherein the instructions for re-obtaining the IP connection resource include instructions for:
determining a first public data network (PDN) connection used to send the uplink data;
determining whether a quantity of public data network PDN connections currently existing in the terminal device is greater than 1; and
performing at least one of:
disconnecting and re-establish the first PDN connection if the quantity of public data network PDN connections is greater than 1; or
determining, if the quantity of public data network PDN connections is not greater than 1, whether an operator corresponding to the terminal device supports a plurality of PDN connections, and performing at least one of:
re-establish the first PDN connection if the operator corresponding to the terminal device supports a plurality of PDN connections; or
trigger a tracking area update TAU procedure if the operator corresponding to the terminal device does not support a plurality of PDN connections.

9. The device according to claim 8, wherein a data type of the uplink data comprises at least one of a Transmission Control Protocol (TCP) type, a domain name system (DNS) type, and a User Datagram Protocol (UDP) type.

10. The device according to claim 8, wherein the program further includes instructions to:
determine that signal received quality of the terminal device is greater than a preset quality threshold.

11. The device according to claim 8, wherein the program further includes instructions to:
re-establish the RRC connection, and determine whether a downlink data link fault is rectified; and
re-obtain the IP connection resource if it is determined that the downlink data link fault is not rectified.

12. The device according to claim 8, wherein the program further includes instructions to:
determine whether a quantity of data units in an uplink cache queue in a data link layer is less than a second threshold, and a quantity of data units in a downlink cache queue in the data link layer is greater than a third threshold; and perform at least one of:
- re-obtain the IP connection resource if the quantity of data units in the uplink cache queue is less than the second threshold, and the quantity of data units in the downlink cache queue is greater than the third threshold; or
- perform, if the quantity of data units in the uplink cache queue is not less than the second threshold, or the quantity of data units in the downlink cache queue is not greater than the third threshold:
  - re-establish the RRC connection, and determine whether a downlink data link fault is rectified; and
  - if it is determined that the downlink data link fault is not rectified, re-obtain the IP connection resource.

13. The device according to claim 8, wherein the program further includes instructions to:
determine a base station to which the terminal device is currently connected; and
re-establish an RRC connection to the base station.

14. The device according to claim 8, wherein the program further includes instructions to:
determine a core network corresponding to the uplink data, and establish a standby PDN connection to the core network;
disconnect and re-establish the first PDN connection; and
disconnect the standby PDN connection.

15. The method according to claim 1, wherein the re-obtaining the IP connection resource comprises establishing a public data network (PDN) connection.

16. The device according to claim 8, wherein the re-obtaining the IP connection resource comprises establishing a public data network (PDN) connection.

* * * * *